United States Patent Office 2,967,487
Patented Jan. 10, 1961

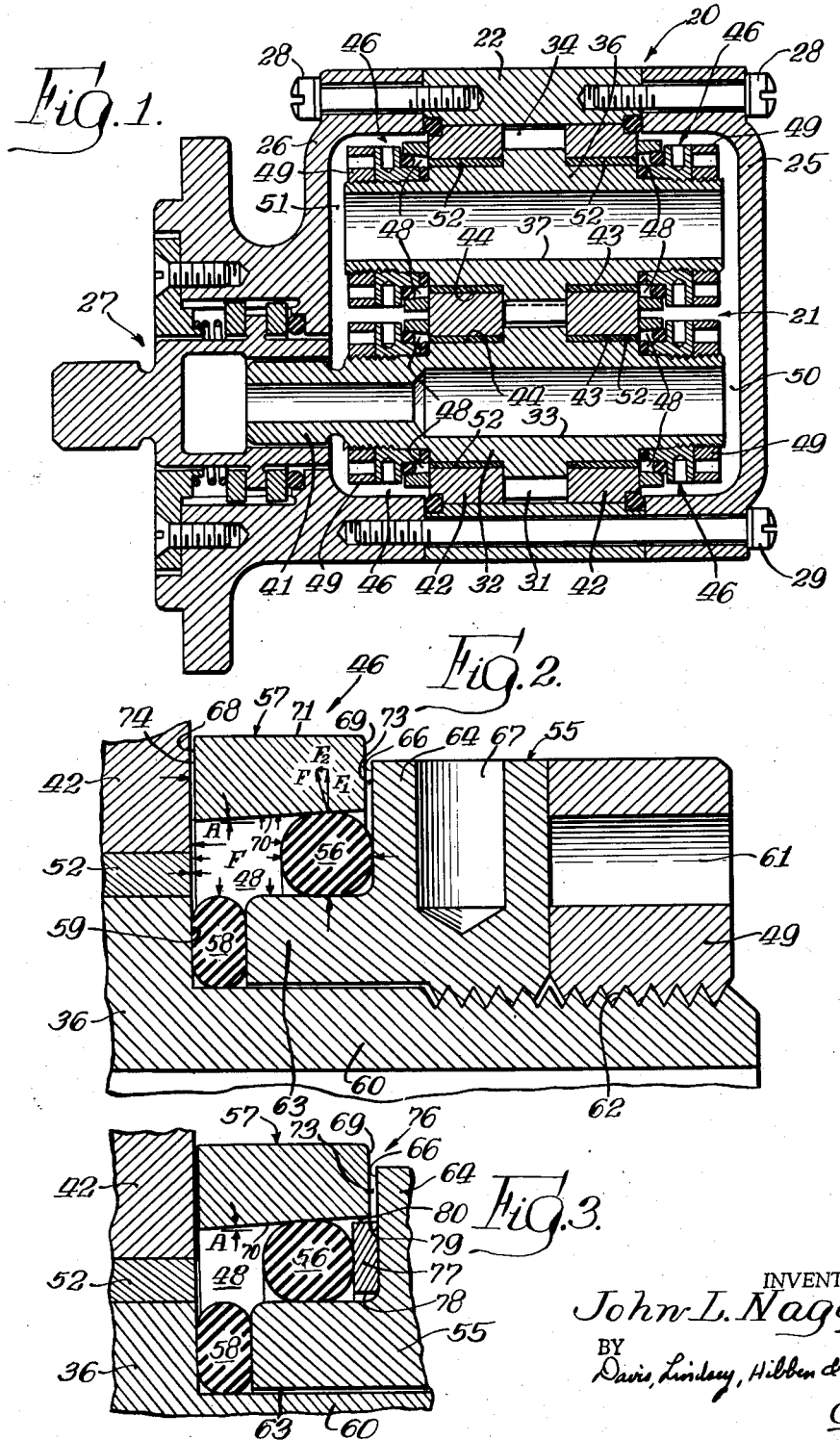

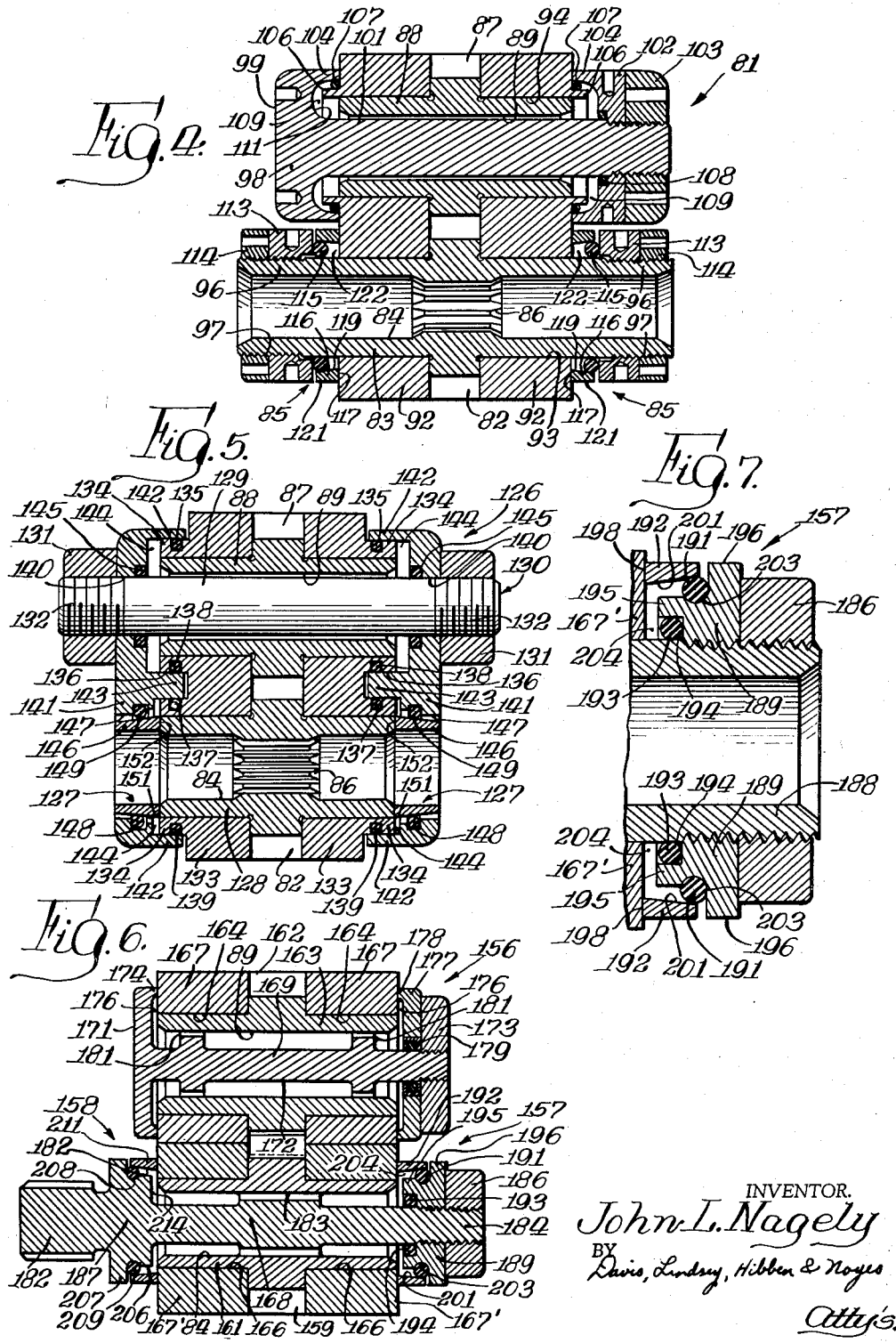

2,967,487

COMPENSATING SEAL FOR GEAR PUMP
OR MOTOR

John L. Nagely, 1745 Valley View Drive,
Grosse Pointe Park, Mich.

Filed Jan. 15, 1958, Ser. No. 709,045

10 Claims. (Cl. 103—126)

This application is a continuation-in-part of my copending application, Serial Number 624,584, filed November 27, 1956, now Patent No. 2,848,953.

This invention relates to a compensating seal, and more particularly relates to a compensating seal that is adapted to confine working fluid in a chamber adjacent a pair of relatively moving parts while accommodating positional variations therebetween.

In my prior United States Patent Number 2,772,638 and copending application, Serial Number 624,584, filed November 27, 1956, now Patent No. 2,848,953, I have disclosed and described several types of improved gear-type fluid displacement devices employing a unitary internal assembly construction incorporating working fluid pressure loading chambers around the outer side faces of supporting end plates that rotatably journal the liquid displacement elements of the assemblies and counterbalance the fluid pressure forces tending to separate the end plates from positions adjacent the liquid displacement elements. An important feature of such construction is the provision of dynamic or rotating seal means between the pressure loading chambers and the coacting end plates so that the desired fluid pressure is maintained in each chamber while at the same time accommodating relative motion between the seal and the end plate.

As a result of the high fluid pressure conditions existing in the fluid reaction or pressure zone of the device and the elevated temperatures often involved in the operation of fluid displacement devices of the disclosed types, excessive leakage may sometimes occur at the dynamic seals of the pressure loading chambers either because of mechanical imperfections or positional variations of the structural elements. Consequently, some form of compensating seal is desirable to compensate for mechanical inaccuracies and particularly to accommodate thermal induced and tensile stress-induced positional variations of the associated components of the device while maintaining the desired working fluid pressure in the pressure loading chambers. Although the compensating seal arrangement of the present invention is particularly adapted for use in a device of the type described in my aforementioned United States patent and copending application, the compensating seal of my invention is also applicable in other types of fluid displacement devices and sealing arrangements where it is necessary or desirable to isolate or prevent leakage of high pressure fluid from a zone around a pair of relatively moving parts.

Accordingly, a primary object of the invention is to provide a novel and improved dynamic seal means for confining pressurized fluid in a zone adjacent a pair of relatively movable parts, such as in a fluid displacement device or the like, and which will compensate for mechanical inaccuracies and thermal induced or tensile stress-induced positional variations of the parts while maintaining a pressure sealed relationship therebetween.

Another object of the invention is to provide a novel and improved compensating seal for confining a quantity of pressurized fluid in a zone adjacent a pair of relatively rotatable parts, such that a reaction force will be continuously imposed on at least one of said relatively rotatable parts, regardless of positional variations therebetween resulting from slight mechanical imperfections and from tensile and thermal stresses.

A further object of the invention is to provide a novel compensating seal of the aforementioned character which is simple, inexpensive, and easy to maintain and repair.

Other objects and advantages of the invention will become evident from the subsequent detailed description taken with the accompanying drawings, wherein:

Figure 1 is a longitudinal sectional view of a gear-type liquid displacement device that includes a compensating seal constructed according to the principles of the invention and comprising one specific embodiment thereof;

Figure 2 is an enlarged fragmentary longitudinal sectional view of a portion of the compensating seal of Figure 1;

Figure 3 is a view, similar to Figure 2, of a modified form of the compensating seal assembly of Figure 2;

Figure 4 is a longitudinal sectional view of an alternate internal unit assembly incorporating another embodiment of the compensating seal arrangement of the invention;

Figure 5 is a longitudinal sectional view of another alternate internal unit assembly incorporating still another embodiment of the compensating seal of the invention;

Figure 6 is a longitudinal sectional view of still another alternate unit assembly incorporating a further embodiment of the compensating seal construction of the invention; and Figure 7 is an enlarged fragmentary sectional view of a compensating seal arrangement similar to that shown in Figure 6 but applied to a different type of internal unit assembly.

Briefly described, the present invention generally contemplates a compensating seal construction for confining a quantity of pressurized fluid in a zone adjacent a pair of relatively movable parts and is particularly adapted to form a pressure sealed compensating boundary for a pressure loading chamber adjacent an end plate of a meshed gear-type fluid displacement device in which the fluid pressure force tending to separate the end plate from the gear faces is counterbalanced by the fluid pressure in the pressure loading chamber. It is an important feature of the seal that the thermal-induced and tensile stress-induced positional variations of the fluid displacement device components adjacent the pressure loading chambers are accommodated by the compensating boundary features of the seal without loss of fluid pressure in the pressure loading chambers.

Referring now to Figures 1 and 2 of the drawings, one embodiment of my invention is illustrated in conjunction with the internal unit assembly of a gear-type liquid displacement device, the details and operation of which are described in my United States Patent No. 2,772,638. It will suffice for the purposes of the present invention to generally summarize the more salient structural features and aspects of the gear pump or motor assembly illustrated in Figure 1, and the removable internal unit assembly thereof, in order to set forth the environment of the present invention.

By way of illustration only, the fluid displacement device or pump illustrated in Figure 1 comprises an external housing or casing, indicated generally at 20, and an internal unit assembly, indicated generally at 21, the latter constituting the operating mechanism of the pump and being readily removable as a unit from the housing 20. The external casing 20 includes a central body portion 22 having fluid inlet and outlet ports (not shown), a cover portion 25 at one end of the body, and a cover portion 26 at the opposite end of the device including a driving means and a seal means, indicated generally at 27. The cover portions 25 and 26 are removably secured to the body portion 22 by means of screws 28 and 29.

The internal unit assembly 21 comprises, in this instance, a pair of fluid reaction members, namely a drive gear 31 carried on a gear shaft 32 having an axial bore 33, and a driven gear 34 meshed with the gear 31 and carried integrally on a gear shaft 36 having an axial bore 37 therethrough. The gears 31 and 34 are surrounded by the body portion of the pump casing 20 which provides a fluid pressure zone comprising a low pressure inlet chamber (not shown) and a high pressure discharge chamber (not shown) at opposite sides of the meshed gears. The end of the drive gear shaft 32 adjacent the cover 26 carries an extension formed with a male drive spline 41 which is detachably fitted into a complementary female spline connection in the drive means 27.

In order to provide a pumping seal with the gears 31 and 34, a pair of support elements or end plates 42 are disposed at the opposite side faces of the meshed gears, each end plate having a pair of upper and lower bores 43 therein defining bearing journals 44 through which the gear shafts 32 and 36 extend at their opposite ends. The external contours of the end plates 42 are formed to permit a close clearance fit in the body portion 22 of the housing. The gears 31 and 34 and the end plates 42 thus constitute a pair of relatively rotatable parts.

Encircling the outer end portions of the gear shafts 32 and 36 are the compensating seal assemblies of the present invention, indicated generally at 46, which cooperate with adjacent surfaces of the end plates 42 and gear shafts 32 and 36 to define annular pressure loading chambers 48 therebetween, the details and operation of which will hereinafter be described. The compensating seal assemblies 46 are retained on the threaded end portions of the gear shafts 32 and 36 by lock nuts 49 which are spaced inwardly from the adjacent covers 25 and 26 to provide a pair of chambers 50 and 51 which are in communication through the gear shaft bores 33 and 37 for receiving working fluid under relatively low pressures.

In order to rotatably journal the gear shafts 32 and 36 in the end plates 42, integral bearing surfaces or bushings may be provided in the inner circumferences of the bores 43 such as annular sleeves or bushings 52, which may be formed of any suitable bearing material. The end plates 42 may be formed of any desirable material having sufficient strength and wear properties to resist excessive deflections or deformations resulting from continued operation of the device under high fluid pressure conditions.

As described in more detail in my prior United States Patent No. 2,772,638, the purpose and function of pressurized working fluid in the pressure loading chambers 48 of the internal unit assembly 21 is to counterbalance the working fluid pressure forces in the high pressure chamber of the pump, tending to separate the end plates 42 from the side faces of the gears 31 and 34. Each pressure loading chamber 48 receives high pressure working fluid from the high pressure or discharge side of the pump chamber through suitable internal passageways (not shown) in the end plates 42 such that a counterbalancing fluid pressure force is provided tending to urge each of the end plates 42 inwardly against the outer side faces of the gears 31 and 34 to thus maintain a predetermined running clearance therebetween. The reaction forces from the pressure loading chambers 48 are transmitted through the compensating seal assemblies 46 and retainer nuts 49 to the gear shafts 32 and 36 which function as tension members to resist the imposed forces. It will be understood that by proper correlation of the effective exposed areas of the end plates 42, both in the high pressure chamber of the pump and in the annular pressure loading chambers 48, an unbalanced force may be provided which acts inwardly on the end plates and is always greater than the force exerted outwardly against the end plates.

Referring now more particularly to Figure 2, the details of the compensating seal assembly 46 at the right-hand end of gear shaft 36 will be described by way of illustration, but it should be understood that the description thereof is also applicable to the remaining compensating seal assemblies. The essential elements of the compensating seal assembly 46 are an annular adjustable thrust member 55 threadedly mounted on a reduced diameter end portion 60 of the shaft 36 adjacent the retaining nut 49, a rigid metallic "floating" seal ring 57 in sealing engagement with the outer face of the adjacent end plate 42, and a resilient support ring 56 of rubber or the like interposed between the thrust member and the seal ring. The resilient ring 56 may be bonded to the metallic seal ring 57 or may simply be assembled therewith under slight compression. A resilient seal ring 58 is disposed between the inner axial end portion of the thrust member 55 and a shoulder 59 on the gear shaft 36 adjacent the reduced diameter portion 60 thereof, the seal ring 58 providing a static shaft seal to prevent leakage of working fluid through the threaded connection of the thrust member 55 with the shaft portion 60. The retainer nut 49 abuts the adjustable thrust member 55 for locking the latter in initially adjusted position relative to the end plate 42, as will hereinafter be described in more detail, and the nut 49 may be provided with a plurality of bores 61 to facilitate adjustment thereof along the threads, designated at 62, of the shaft portion 60.

The thrust member 55, in this embodiment, is formed with an axially inwardly extending cylindrical sleeve portion 63 having a radial thickness substantially equal to the undercut depth of the reduced diameter shaft portion 60 and an annular radially outwardly extending abutment portion 64 disposed axially outwardly from the end plates 42 and defining an annular shoulder 66 for retaining the resilient support ring 56. The abutment portion 64 also includes a plurality of radial bores 67 to facilitate adjustment of the thrust member 55 relative to the end plates 42 when the seal assembly 46 is being initially installed.

It will be noted that the extent of radial outward projection of the shoulder 66 is such as to overlap completely the resilient support ring 56 and at least partially overlap the seal ring 57 so that the ring 56 is effectively retained between the parts 57, 64, and 63. The thrust member 55 and retainer nut 49 may be constructed of materials similar to the end plates 42, such as high strength alloy steels, and the like, in order to resist deflection and deformation as a result of the counterbalancing pressure forces in the pressure loading chambers 48.

The resilient support ring 56 is preferably a conventional rubber O-ring having a cross-sectional diameter somewhat less than the axial length of the sleeve portion 63 and less than the radial dimension of the abutment portion 64 of the thrust member 55. The overall diameter of the O-ring 56 is such as to permit a snug-fitting engagement around the cylindrical sleeve portion 63 of the thrust member 55. It should be understood that while the support ring 56 is preferably formed of rubber, other suitable resilient materials could be employed, depending on the particular operating conditions and working fluid to be encountered.

The floating seal ring 57 comprises an inexpensive and readily replaceable metallic seal element which is adapted to be machined or otherwise accurately surfaced at its innermost axial end so as to provide a high degree of flatness for sealing engagement with the end plate 42. As best shown in Figure 2, the seal ring 57 has a generally rectangular cross-sectional configuration that includes inner and outer axial end face portions 68 and 69, respectively, and internal and external peripheral surface portions 70 and 71, respectively. It will be noted that the annular inner peripheral surface portion 70 has a conically or axially tapered configuration, the slight taper angle with respect to the general longitudinal axis of the ring 57 and the gear shaft 36 being indicated generally in Figure 2 by the letter A. The purpose and function of the axially tapered internal peripheral surface portion 70 is described hereinafter. The outer peripheral surface 71 of the ring 57 is cylindrical in this instance.

Throughout the specification reference will be made to the peripheral surface of the floating seal ring in each embodiment of the invention, it being understood that the term peripheral surface refers either to the inner or outer annular surface of the ring, as the case may be.

Upon initial assembly of the compensating seal means 46, the thrust member 55 is adjusted and locked in place by the retaining nut 49 to provide a predetermined clearance between the shoulder 66 and the outer axial end 69 of the seal ring 57. The tapered internal surface 70 of the seal ring 57 compressively engages the resilient support ring 56 to place the latter in a pre-stressed condition, the reactive force thereof being effective to urge the contact face 68 of the seal ring 57 into engagement with the adjacent bearing face of the end plate 42 under a relatively small force dependent upon the angle A and the extent of compression of the ring 56. The annular pressure loading chamber 48 is thus defined by the engaged assembled relationship of the seal ring 57, the resilient support ring 56, the thrust member 55, the static shaft seal 58, and the adjacent side face of the end plate 42 and its bearing material 52, the shaft 36 and end plate 42 comprising a pair of relatively rotatable parts. The frictional forces resulting from the engaged relationship of each of the components of the compensating seal assembly 46 will thus create a driving relation between the thrust member 55, the resilient ring 56, and the seal ring 57 such that the entire assembly rotates in unison with the gear shaft 36.

In order to provide the pressure sealed relation of the seal ring 57 with the end plate 42 and to afford the fluid pressure force counterbalancing features of the unit, pressurized working fluid from the high pressure discharge chamber of the unit is communicated to the annular pressure loading chamber 48 by suitable passages (not shown), thereby to subject the internal boundary portions of the pressure loading chamber 48 to a fluid pressure force illustrated graphically at F in Figure 2. Under the high pressure of the fluid in the chamber 48, the resilient ring 56 is deformed and crowded into the corners of the confined chamber so that the fluid pressure is applied to substantially the entire tapered surface boundary 70 by direct contact of the fluid and also through the ring 56.

The pressure loading force F that acts perpendicularly on the tapered surface 70 is thus inclined inwardly from the perpendicular to the axis of the gear shaft 36 by the small angle A. The pressure loading force F may be resolved, as indicated on Figure 2, into a radial outward component $F_1$ perpendicular to the axis of the gear shaft 36 and a small axial inward component $F_2$ which acts on the seal ring 57 in conjunction with the initial force imposed by adjustment of the thrust member 55, to urge the end face portion 68 of the seal ring into positive engagement with the end plate 42, irrespective of mechanical imperfections and positional variations of the parts due to temperature and/or working stresses. It will be apparent that the magnitude of the force component $F_2$ will vary as a function of the magnitude of the pressure loading force F and the angle A. Preferably, the angle A is from 1° to about 10°.

By the foregoing arrangement the seal ring 57 is resiliently and movably supported by the resilient support ring 56 to form a movable or compensating boundary portion for the pressure loading chamber 48, the seal ring 57 being adapted to undergo limited movement axially with respect to the gear shaft 36 during thermal induced and tensile stress induced positional variations between the end plate 42 and gear shaft 36. In other words, the seal ring 57 has a so-called "floating" support so as to compensate for slight differences in thermal expansion between the operating elements, which may tend either to increase or decrease the clearance at the seal interface, and also accommodate any slight increase in clearance which may result from elongation of the tension members, in this case the gear shafts 32 and 36. In addition, minor surface misalignments and production inaccuracies can thus be accommodated by the movable boundary portion of the compensating seal assembly 46 without danger of excessive leakage at the pressure sealed interface. Furthermore, as will readily be understood, the resilient support for the seal ring 57 permits a limited degree of angular cocking of the ring 57 in order to obtain absolute parallelism of the engaged surfaces at 42—68 in spite of minor inaccuracies or misalignment at either surface. Lubrication of the seal interface at 68—42 is provided by controlled leakage of high pressure working fluid through the interface into the surrounding low pressure cover chamber 50. For this purpose one or more small grooves or channels may be provided in either surface to meter the flow of fluid into the cover chamber and to provide for proper fluid distribution at the interface. In Figure 2 a metering groove 74 is shown on an exaggerated scale in the end surface 68 of the seal ring 57.

In assembled condition, it is important that the seal ring 57 and the shoulder 66 have an annular clearance space 73 therebetween, the axial width of which will depend upon the maximum positional variations to be expected between the end plates 42 and the gear shaft 36, as a result of differential thermal expansion of these members or tensile elongation of the shaft 36 during operation of the unit at high working fluid pressures. However, the clearance space 73 will generally be relatively small in order to minimize any tendencies of the resilient ring 56 to extrude through the clearance space under high fluid pressures in the chamber 48.

Referring now to Figure 3, a modified seal assembly 76 of my invention is illustrated, the seal assembly 76 differing from the seal assembly 46 of Figures 1 and 2 in that a rigid annular back-up ring 77 is provided between the resilient support ring 56 and the annular retaining shoulder 66 to prevent extrusion of the resilient seal member 56 into the clearance space 73 whenever extremely high fluid pressures are to be encountered in the pressure loading chamber 48 or whenever a relatively large clearance space 73 is necessary.

The back-up ring 77 has a generally rectangular cross-sectional configuration that includes an annular inner circumferential surface 78 and an outer circumferential surface 79, the radial width of the ring 77 being somewhat less than the cross-sectional diameter of the resilient seal member 56 whereby to provide an annular clearance space 80 between the outer circumferential surface 79 and the tapered surface 70 of the seal ring 57 so as to avoid interference with the self-adjusting movement of the latter as heretofore described. Preferably, the annular outer circumferential surface 79 of the back-up ring 77 has a taper which is complementary to the taper of the surface 70, thus permitting close parallel proximity of the internal axially tapering surface 70 and the external axially tapering surface 79 and allowing substantial axial shifting of the seal ring 57.

Referring now to Figure 4, a somewhat different internal unit assembly 81 is illustrated which incorporates a modified compensating seal assembly 85 constructed according to the principles of my invention. The internal unit assembly 81 is similar to the internal unit assembly 21 of Figure 1 in that it is adapted to be readily removable as a unit from the housing of the device. However, in this instance, one of the tension members for resisting the pressure loading forces comprises a gear shaft as in Figure 1 and the other tension member is an element separate from the gear shafts, as fully disclosed in my aforementioned copending application Serial No. 624,584.

As seen in Figure 4, the internal unit assembly 81 comprises a drive gear 82 carried integrally on a gear shaft 83 having an axial bore and a central internally splined portion 86 that is adapted to receive an inwardly extending male drive member (not shown) for transmitting rotative torque to the gear 82. A driven gear 87 meshes with the driving gear 82 and is carried integrally on a gear shaft 88 having an axial bore 89. In order to rotatably journal and support the gears 82 and 87, a pair of end plates or support means 92 are disposed adjacent the opposite side faces of the meshed gears, each end plate having a lower bore 93 and an upper bore 94 constituting bearing journals for the gear shafts 83 and 88. It will be noted that the lower gear shaft 83 extends through its journalling bore 93 and has its outwardly extending end portion 96 threaded, as at 97, while the gear shaft 88 terminates at the outer faces of the end plates 92.

The pressure loading chamber and tension resisting arrangement at the gear shaft 88 includes a separate tension member 98 having a head 99 and an elongated shaft portion 101 extending coaxially through the axial bore 89 of the gear shaft 88, a sealed thrust collar 102, and a retaining nut 103 threadedly engaged on the opposite end of the shaft portion 101 and abutting the thrust collar 102. The head 99 of the tension member 98 and the thrust collar 102 are formed with annular axially inwardly extending flanges or lips 104 that overlap a pair of corresponding annular outwardly extending flanges or tubular projections 106 formed on the outer faces of the end plates 92. A pair of seal rings 107 are disposed between the flanged portions 104 and 106 and a seal ring 108 is disposed between the thrust collar 102 and the shaft 101 to define a pair of annular pressure loading chambers 109. High pressure working fluid is communicated to the pressure loading chambers 109 by internal passages (not shown) so that working fluid pressure in the chambers 109 counterbalances the fluid pressure force tending to separate the end plates 92 from the side faces of the meshed gears 82 and 87, and the reaction forces are resisted by the tension member 98 which is independent of the gear shaft 88. As will be apparent, the tension member 98 is non-rotating or fixed with respect to the end plates 92.

The fluid pressure loading chamber and tension member construction for the gear shaft 83 is substantially identical to that employed in the internal unit assembly 21 of Figure 1, in that the gear shaft 83 itself acts as the tension member and thus resists the reaction forces from the pressure loading chambers. As in the compensating seal assembly 46 of Figures 1 and 2, each compensating seal assembly 85 includes an annular adjustable thrust member 113 and a retaining nut 114 threadedly mounted in one of the end portions 96 of the gear shaft 83. An annular seal ring 116, similar to the seal ring 57 in Figures 1 and 2, is supported in self-adjustable "floating" relation by a resilient support ring 115, the seal ring 116 having an inner axial end face 117 engaging the outer face of the adjacent end plate 92. In this embodiment the resilient support ring 115 fits snugly around the gear shaft 83 and abuts the thrust member 113 so that a separate static shaft seal, such as the ring 58 in Figures 1 and 2, is eliminated. The seal ring 116 is formed with an internal conical or tapered surface 119 which provides a compensating boundary portion of an annular pressure loading chamber 112 defined by the seal ring 116, the resilient support ring 115, the gear shaft 83 and the adjacent face of the end plate 92. The pressure loading chamber 122 is filled with pressurized working fluid from the high fluid pressure zone of the pump, thereby to counterbalance the fluid pressure force tending to separate the end plates 92 from the side faces of the meshed gears 82 and 87, as in the previously described embodiment.

It will thus be apparent that the compensating seal assembly 85 differs from the compensating seal assembly 46 of the previous embodiment only to the extent that it eliminates a separate static pressure seal around the gear shaft and adjacent the thrust member. The simplified construction of the compensating seal assembly 85 thus affords reduced unit cost and simplicity of installation and is particularly applicable where the working fluid pressure encountered in the pressure loading chambers 122 is not extremely high such as would cause extrusion of the resilient ring 115 between the seal ring 116 and the adjacent thrust member 113. The adjustment and operation of the compensating seal assembly 85 is in all other respects substantially identical with that of the compensating seal assembly 46 heretofore described.

Referring now to Figure 5, another internal unit assembly 126 is illustrated which includes a different form 127 of the compensating seal. This embodiment of the invention is also shown in Figure 5 of my aforementioned copending application Serial No. 624,584. The internal unit assembly 126 includes an integral drive gear shaft 128 having an axial bore 84 and a central internal splined portion 86. The gear 82 meshes with a driven gear 87 that is integrally carried by a gear shaft 88 having an axial bore 89 therethrough.

The hollow gear shaft 88 coaxially receives the shaft portion 129 of a separate tension member 130 which is generally similar to the tension member 98 in Figure 4 and is provided with a pair of nuts 131 threaded onto its ends 132.

A pair of end plates 133 are provided which include axially outwardly extending boss portions 134 formed in the outer side faces thereof, the boss portions 134 having an annular circumferential groove 135 in which a seal ring 139 is seated. Each end plate 133 also has a central axial bore 136 provided with a groove 137 to receive an annular seal 138 therein. The thrust means for the internal unit assembly 126 comprises a pair of thrust plates 141 which extend across substantially the entire outer faces of the end plates 133 and are axially spaced from the ends of the gear shafts 128 and 88. Each thrust plate 141 is formed with a circumferential skirt or rim portion 142 and a central axially inwardly extending plunger portion 143, the internal dimensions of the skirt portion 142 being such as to permit an overlapping telescopic fit around the boss portion 134 of the corresponding plate and a piloted engagement of the plunger portion 143 in the axial bore 136 of the end plate. The plunger portion 143 thus serves to index and strengthen the engaged relation of thrust plates 141 with the end plates 133 as well as to remove some of the bending moments imposed on the tension member 130. The spaced relation of the thrust plates 141 from the end plates 133, with the seal rings 139 interposed therebetween, defines a pair of elongated pressure loading chambers 144 which are supplied with high pressure fluid by suitable passageways (not shown) and which cooperate with the seal assemblies 127 to maintain the inner surfaces of the end plates 133 in running pressure sealed engagement with the gears 82 and 87. The single tension member 130 extends at its ends 132 through apertures 140 in the thrust plates 141, which are sealed by rings 145, and the nuts 131 transmit the reaction forces from the thrust plates 141 to the tension member.

The compensating seal assembly 127 at each end of the gear shaft 128 may be referred to as an inverse modification in that a seal ring 146 has its outer peripheral surface encircled by an outermost resilient support ring 149 rather than the support ring being located internally of the seal ring as in the other embodiments of the invention. The seal ring 146 is coaxial with the gear shaft 128 and extends into an opening 147 in the corresponding thrust plate 141. The resilient support ring 149 is mounted in a groove 148 adjacent the opening 147 and snugly engages the tapered outer surface, designated at 151, of the seal ring 146 for resiliently supporting the latter while at the same time permitting limited axial or angular cocking movement thereof. The inner axial end 152 of the seal ring 146 abuts or engages the axial end of the gear shaft 128, the seal ring 146 being restrained against rotation by the gripping action of the resilient support ring 149 and being urged axially toward the gear shaft 128 by the combined action of fluid pressure in the chamber 144 acting on the tapered surface 151 and the initial adjustment of the nuts 131. Consequently, a seal interface is defined between the engaging end face of the rotating gear shaft 128 and the inner end 152 of the non-rotating seal ring 146.

Thus, the operation of the seal assembly 127 is substantially identical to that of the seal assemblies 46 and 85 in Figures 1 and 4, respectively, in that the seal ring 146 has its end face 152 maintained in pressure sealed relationship with the corresponding end face of the gear shaft 128 as a result of the action of working fluid pressure in the pressure loading chamber 144 on the external tapering surface 151 of the seal ring 146 and the prestressed resilient support ring 149, in the manner previously described. The aperture 147 in each thrust plate 141 may be tapered, if desired, in order to better accommodate axial movement of the seal ring 146 resulting from thermal-induced and tensile stress-induced positional variations between the gear shaft 128 and the end plates 133. As in the previous embodiments, and as is described in more detail in my copending application Serial No. 624,584, a certain amount of high pressure working fluid will leak from the pressure loading chambers 144 across the seal interfaces between the ends of the gear shaft 128 and the seal rings 146 for lubrication purposes.

Figure 6 shows another internal unit assembly 156 having separate tension members mounted coaxially with both gear shafts, one tension member being fixed and the other being rotatable with its gear shaft. The rotatable tension member is provided with compensating seal assemblies 157 and 158 which differ only slightly from the seals 46 in Figures 1 and 2. The internal unit assembly 156 is identical with Figure 1 of my copending application Serial No. 624,584 so that only a brief description will be given before proceeding with the detailed explanation of the compensating seal assembly embodiments 157 and 158 which constitute the present invention.

The internal unit assembly 156 generally comprises an integral driving gear 159 and shaft 161 having an axial bore 84 and an integral driven shaft 163 and gear 162 meshed with the driving gear 159, the shaft 163 having an axial bore 89. Each of the gear shafts 161 and 163 are rotatably journalled in a pair of upper and lower bearing bores 164 and 166 formed in a pair of spaced two-piece end plate structures comprising upper and lower end plate members 167 and 167', respectively.

As previously mentioned, a pair of elongated tension members 168 and 169 are disposed coaxially in the axial bores 84 and 89 of the gear shafts 161 and 163, respectively. The tension member 169 is similar to the tension member 98 of Figure 4 in that it includes an enlarged head portion 171 and a shaft portion 172 which is threaded at its remote end opposite the head portion 171 to receive a retainer nut 173. The head 171 is annularly internally recessed to define an annular inwardly extending rim or lip 174 that engages the outer face of the adjacent end plate 167 to thus define an annular pressure loading chamber 176 therebetween. A thrust collar 177 is carried by the remote threaded end of the tension member 169 and is also formed with an annular inwardly extending rim or lip 178 for engagement with the outer face of the other end plate 167 to define a complemental pressure loading chamber 176 therebetween. An annular static seal 179 is provided between the tension member shaft 169 and thrust collar 177. In order to maintain an internal coaxial alignment of the tension member shaft portion 169 in the gear shaft 163, a pair of spaced spiders or pilot elements 181 are provided therebetween. Inasmuch as the tension member 169 does not have to rotate with the driven gear 162, no interconnection is provided, it being understood that adjustment of the retainer nut 173 may be effected to maintain the desired running clearance between the respective end plate members 167 and the thrust elements 171 and 177 and also for establishing the desired maximum clearance between the end plate members 167 and the side faces of the gears 159 and 162. By means not shown, pressurized working fluid is supplied to the pressure loading chambers 176 to effect the pressure loading of the end plate members 167, the reaction forces being resisted by the tension member 169.

The tension member 168 differs from the tension member 169 in that it is arranged for rotation in unison with the gear shaft 161. A threaded end portion 184 carries the compensating seal assembly 157 and a retaining nut 186. The tension member 168 is also formed at its drive end with an enlarged annular radially outwardly extending integral collar portion 187 which carries the compensating seal assembly 158. The stub shaft 182 forms the input point for transmitting rotating torque to the tension member 168 and gear 159 via the internal splined connection 183.

The compensating seal assembly 157 is substantially similar to the compensating seal assembly 46 of Figures 1 and 2 in that it includes an annular thrust member 189, a resilient support ring 191 carried by the thrust member 189, an annular seal ring 192 carried by the resilient ring 191, and a static shaft seal 193. However, in this case the shaft seal 193 is seated in a recessed annular groove 194 in an axially extended sleeve portion 195 of the thrust member 189 and the resilient support ring 191 is likewise disposed in a groove 203 formed in a radially outwardly extending abutment portion 196 of the thrust member 189. The seal ring 192 is substantially identical to the seal ring 57 illustrated in Figure 2 and includes an end face 198 and annular internal conically tapered surface 201 engaged by the resilient support ring 191 for the same purpose heretofore described. The thrust member 189, the resilient support ring 191, the seal ring 192, and the adjacent face of the end plate 167' together define an annular pressure loading chamber 204 which receives high pressure working fluid in order to provide the pressure loading of the corresponding end plate member 167'. The seal 157 accommodates thermal-induced and tensile stress-induced positional variations of the various components in the manner previously described. The compensating seal assembly 158 is similar to the compensating seal assembly 157 except that the integral collar portion 187 takes the place of the adjustable thrust member 189. The collar portion 187 includes an axially extending cylindrical sleeve portion 206, a radially outwardly extending abutment portion 207, and an annular groove 208 for seating a resilient support ring 209 which in turn supports a seal ring 211 having an internal conically tapered surface 212. Inasmuch as the collar portion 187 is integral with the tension member 168, the static shaft seal and its retaining groove are omitted from the seal assembly 158. The seal structure defines a pressure loading chamber 214 which functions in the manner already described. Figure 7 illustrates a further modification showing the manner in which the seal assembly 157 may be applied at the end of a hollow gear shaft 188 instead of at the end of the solid tension member 168 as shown in Figure 6. Because of the similarity of structure, the remaining parts of Figure 7 are identified by the same reference numerals used in Figure 6 and further description is unnecessary.

While certain specific embodiments of my invention have been herein disclosed and described, it should be understood that various modifications and variations thereof may be effected without departing from the scope of the invention as defined in the appended claims.

I claim:

1. In a fluid displacement device of the character described including at least one fluid reaction member adapted to be rotatably mounted in a fluid pressure zone, the combination of a support element adapted to be mounted adjacent said reaction member with the fluid pressure in said zone tending to urge said element away from said reaction member, means cooperating with said support element for rotatably mounting said reaction member and for holding said support element against movement due to said pressure including a shaft element and a thrust member, a seal ring having a peripheral surface defining with said thrust member and said support element a fluid pressure loading chamber adapted to contain high pressure fluid to counterbalance the force on said support element of the fluid pressure in said zone, said seal ring having an end surface cooperating with a complementary surface on one of said elements for relative rotation therebetween and in pressure sealed relation therewith, said peripheral surface of said seal ring being tapered in a direction to provide a component of the force exerted by said high pressure fluid in said chamber to hold said seal ring in said pressure sealed relation, and a resilient ring interposed between and in sealing relation with said thrust member and said seal ring, said resilient ring being yieldable for facilitating alignment and accommodating limited movement of said seal ring to compensate for mechanical inaccuracies and positional variations.

2. In a gear-type liquid displacement device of the character described including a pair of meshed gears adapted to be rotatably mounted in a liquid reaction zone, the combination of an end plate element adapted to be mounted adjacent one of said gears with the liquid pressure in said zone tending to urge said element away from said gears, means cooperating with said end plate element for rotatably mounting said gears and for holding said end plate element against movement due to said pressure including a shaft element and a thrust member, a seal ring having a peripheral surface defining with said thrust member and said end plate element a liquid pressure loading chamber adapted to contain high pressure liquid to counterbalance the force on said end plate element of the liquid pressure in said zone, said seal ring having an end surface cooperating with a complementary surface on one of said elements for relative rotation therebetween and in pressure sealed relation therewith, said peripheral surface of said seal ring being tapered in a direction to provide a component of the force exerted by said high pressure liquid in said chamber to hold said seal ring in said pressure sealed relation, and a resilient ring interposed between and in sealing relation with said thrust member and said seal ring, said resilient ring being yieldable for facilitating alignment and accommodating limited movement of said seal ring to compensate for mechanical inaccuracies and positional variations.

3. A compensating seal assembly of the character described for preventing escape of high pressure fluid between a pair or relatively rotatable parts and adapted to confine said fluid in a chamber adjacent said parts while accommodating positional variations therebetween, comprising in combination a thrust member adapted to be held against rotation relative to one of said parts, a seal ring having an end surface adapted to be held in pressure sealed relation with the other of said parts, said seal ring having a peripheral surface cooperating with said thrust member to provide said chamber, said peripheral surface of said seal ring being tapered in a direction to provide a component of the force exerted by said fluid pressure in said chamber for holding said seal ring in said pressure sealed relation, and a resilient ring interposed between and in sealing relation with said thrust member and said seal ring, said resilient ring being yieldable for facilitating alignment and for accommodating limited relative movement between said seal ring and said thrust member to compensate for mechanical inaccuracies and positional variations.

4. A seal assembly according to claim 3, in which said resilient ring is exposed to the fluid pressure in said chamber and transmits the force thereof to said peripheral surface to assist said component in holding said seal ring in said pressure sealed relation.

5. A compensating seal assembly of the character described for preventing escape of high pressure fluid between a fixed support element and a rotatable element and adapted to confine said fluid in a chamber adjacent said elements while accommodating positional variations therebetween, comprising in combination an annular thrust member adapted to be adjustably connected to said rotatable element, an annular seal ring surrounding said rotatable element in axially spaced relation from said thrust member, said seal ring having an axial end sealing face adapted to engage said fixed support element in pressure sealed relation therewith, said seal ring also being tapered at its inner periphery in a direction to provide a component of the force exerted by said fluid pressure in said chamber for holding said seal ring in said pressure sealed relation, and an annular resilient support ring disposed concentrically within said seal ring in engagement with said thrust member and with the tapered inner periphery of said seal ring to define therewith a boundary portion of said chamber, the sealing face portion of said seal ring being urged into said pressure sealed relation by the action of the high pressure fluid in said chamber on said tapered surface, and said resilient support ring being deflectable for permitting self-alignment of the sealing face of said seal ring with the fixed support element and also for permitting limited axial movement of said seal ring within the axial space between said seal ring and said thrust member whereby to accommodate thermal-induced and tensile stress-induced positional variations in said elements.

6. The combination of claim 5 further characterized in that said thrust member is formed with an annular recess in which said resilient support ring is seated.

7. The combination of claim 5 further characterized in that said thrust member has an axially extending tubular portion and a radially extending shoulder portion, said resilient support ring snugly encircling said tubular portion in concentric relation between the latter and said seal ring, and said resilient support ring also abutting said radially extending shoulder portion of said thrust member for retaining the support ring in position.

8. The combination of claim 7 further characterized in that said radially extending shoulder portion of said thrust member extends radially beyond said resilient support ring and is axially spaced from said seal ring for accommodating axial movement of the latter, and an annular back-up element is disposed between said resilient support ring and said shoulder portion for positioning the support ring inwardly from the axial space between said seal ring and said portion whereby to prevent protrusion of the support ring into said axial space under high fluid pressure.

9. The combination of claim 7 further characterized in that said axially extending tubular portion of said thrust member is also formed with an annular groove at the inner axial end of said tubular portion for mounting a static seal ring for preventing fluid leakage along the connection between said thrust member and said rotatable element.

10. A compensating seal assembly of the character described for preventing escape of high pressure fluid between a fixed support element and a rotatable shaft and adapted to confine said fluid in a chamber adjacent said element and shaft, said fixed support element having said rotatable shaft element journalled therein, comprising in combination a thrust plate having means for retaining the same in spaced relation from said support element and defining said chamber therebetween, a seal ring having an axial end sealing face adapted to engage the axial end of said shaft element in pressure sealed relation therewith, said seal ring also being tapered at its outer periphery in a direction to provide a component of the force exerted by said fluid pressure in said chamber for holding said seal ring in said pressure sealed relation, and an annular resilient support ring mounted in said thrust plate and concentrically engaging the tapered outer periphery of said seal ring, the axial sealing face of said seal ring being urged into said pressure sealed relation with said shaft element by the action of the high pressure fluid in said chamber on said tapered surface, and said resilient support ring being deflectable for facilitating alignment and limited movement of said seal ring whereby to compensate for mechanical inaccurracies and positional variations in said element.

References Cited in the file of this patent
UNITED STATES PATENTS

| | | |
|---|---|---|
| 2,398,783 | Gilbert | Apr. 23, 1946 |
| 2,489,191 | Looke | Nov. 22, 1949 |
| 2,665,636 | Lauck et al. | Jan. 12, 1954 |
| 2,714,025 | Heinrich | July 26, 1955 |
| 2,758,548 | Rockwell | Aug. 14, 1956 |
| 2,772,638 | Nagely | Dec. 4, 1956 |
| 2,793,595 | Lauck | May 28, 1957 |
| 2,816,512 | Murray | Dec. 17, 1957 |
| 2,821,928 | Wagner | Feb. 4, 1958 |